United States Patent [19]

Hunter et al.

[11] Patent Number: 5,641,391

[45] Date of Patent: Jun. 24, 1997

[54] THREE DIMENSIONAL MICROFABRICATION BY LOCALIZED ELECTRODEPOSITION AND ETCHING

[76] Inventors: Ian W. Hunter, 6 Oakdale La.; Serge R. Lafontaine, 11 Mill St. Extention, both of Lincoln, Mass. 01773; John D. Madden, 3290 Cypress St., Vancouver B.C., Canada, V6J 3N6

[21] Appl. No.: 440,949

[22] Filed: May 15, 1995

[51] Int. Cl.$^6$ ............................ C25D 5/00; C25D 5/08; C25D 7/06; C25F 3/00

[52] U.S. Cl. ............................ 205/80; 205/133; 205/137; 205/138; 205/139; 205/140; 205/141; 205/142; 205/640; 205/652; 205/654; 205/668; 205/670; 205/672; 205/686

[58] Field of Search ........................ 205/80, 118, 133, 205/137, 138, 139, 140, 141, 142, 640, 652, 668, 670, 672, 686, 654; 204/129.1, 129.5

[56] References Cited

U.S. PATENT DOCUMENTS

| | | | |
|---|---|---|---|
| 3,267,014 | 8/1966 | Sanders | 205/670 |
| 4,349,583 | 9/1982 | Kulynych | 427/53.1 |
| 4,364,802 | 12/1982 | Inoue | 205/118 |
| 4,432,855 | 2/1984 | Romankiw | 204/207 |
| 4,497,692 | 2/1985 | Gezchnski | 204/15 |
| 4,929,402 | 5/1990 | Hull | 264/401 |
| 4,968,390 | 11/1990 | Bard et al. | 205/118 |
| 5,149,404 | 9/1992 | Blonder et al. | 205/686 |
| 5,162,078 | 11/1992 | Bley | 205/75 |
| 5,389,196 | 2/1995 | Bloomstein | 156/643 |

FOREIGN PATENT DOCUMENTS

| | | |
|---|---|---|
| 563 744 | 10/1993 | European Pat. Off. |
| 57-120692 | 7/1982 | Japan . |

OTHER PUBLICATIONS

Uhlir, Jr., "Micromachining with Virtual Electrodes", Rev. of Sci. Instr., vol. 26, No. 10, pp. 965–968 Oct. 1955.

Lin et al., "High Resolution Photoelectrochemical Etching of n–GaAs with the Scanning Electrochemical and Tunneling Microscope", J. of Electrochem. Soc., vol. 134, No. 4, pp. 1038–1039 1987.

Jean M. Hagerhorst et. al. Focussed Excimer Laser Beams: A Technique for Selective Micropatterning. SPIE vol. 998 pp. 105–112 (No Month, 1988).

K. Ikuta, "Three Dimensional Integrated Fluid Systems . . . ", Proceedings—IEEE Micro Mechanical Systems, pp. 1–6, 1994 (No Month).

(List continued on next page.)

Primary Examiner—Kathryn L. Gorgos
Assistant Examiner—Edna Wong

[57] ABSTRACT

Embodiments of the present invention provide a new method for producing a three dimensional object, particularly suited to microfabrication applications. The method includes the steps of providing a substrate with a conducting interface, an electrode having a feature or features that are small relative to the substrate, and a solution. The solution has a reactant that will either etch the substrate or deposit a selected material in an electrochemical reaction. The electrode feature is placed close to but spaced from the interface. A current is passed between the electrode and the interface, through the solution, inducing a localized electrochemical reaction at the interface, resulting in either the deposition of material or the etching of the substrate. Relatively moving the electrode and the substrate along a selected trajectory, including motion normal to the interface, enables the fabrication of a three dimensional object. In an alternative embodiment, current is passed through an orifice placed close to but spaced from the substrate surface, and may be accompanied by forced convection through the orifice. The method provides the potential to fabricate using many materials, including metals, alloys, polymers and semiconductors in three dimensional forms and with sub-micrometer spatial resolution.

17 Claims, 7 Drawing Sheets

OTHER PUBLICATIONS

M. Boman, "Helical Microstructures Grown by Laser Assisted Chemical Vapour Deposition", Proceedings—IEEE Micro Electro Mechanical Systems, pp. 162–167 1992 (No Month).

W.H. Brünger, "E–Beam Induced Fabrication of Microstructures" Micro Electro Mechanical Systems, pp. 168–170, 1992 (No Month).

C.W. Lin, "High Resolution Photoelectrochemical Etching of n–GaAs . . . " J. of Electrochemical Society, vol. 134 pp. 1038–1039, 1987 (No Month).

Scheir, "Creating and Observing Surface Features with a Scanning Tunneling Microscope" SPIE vol. 897 pp. 16–19 1988 (No Month).

A.A. Gewirth, "Fabrication and Characterization of Microtips . . . " Journal of Electroanalytical Chemistry vol. 261, pp. 477–482, 1989.

Nagahara "Preparation and Characterization of STM Tips for Electrochemical Studies", Review of Scientific Instruments vol. 60 pp. 3128–3139 Oct., 1989.

THREE DIMENSIONAL MICROFABRICATION BY LOCALIZED ELECTRODEPOSITION AND ETCHING

TECHNICAL FIELD

This invention relates to the fabrication of three dimensional microstructures by a process of localized electrochemical deposition and localized electrochemical etching.

BACKGROUND OF INVENTION

The miniaturization of electronics has led to devices that are faster, cheaper, and more versatile with every new generation. Building micromechanical devices offers similar benefits. For example, resonant frequencies increase as dimensions are reduced, allowing high bandwidth accelerometers and pressure sensors to be built. Miniature devices integrating actuators, limbs, sensors, computing and energy supplies offer, among other things, the potential to access microscopic spaces, with major implications for medicine. In large scale devices, nature offers many examples of what can be achieved by fabricating macroscopic systems with nanoscopic precision, including ourselves.

In order to realize the potential offered by micro and nanotechnology, it is necessary to manipulate material on micrometer and nanometer scales. Important characteristics of fabrication technologies include (1) spatial resolution, (2) achievable geometry, (3) available materials, (4) fabrication rate and (5) cost. Spatial resolution is defined by the dimensions of the smallest feature that can be produced by a given fabrication method. Achievable geometry refers to the range of shapes a method is capable of producing. The ability to incorporate a wide range of materials is particularly important because microdevices, like macrosystems, in general require actuators, energy delivery and storage, mechanical elements, circuits, and sensors. These functions are unlikely to be optimized using a limited range of materials. The difficulty in assembling and fastening pars on micrometer scales make geometric versatility and wide range of materials particularly desirable properties of a fabrication process.

Traditional milling, welding and fastening technologies do not have the spatial resolution required to generate microdevices. Integrated circuit technology is increasingly being applied to fabricate mechanical, electro-mechanical and electro-opto-mechanical devices on millimeter and micrometer scales, including miniaturized accelerometers and pressure sensors. However, the nearly two-dimensional regime of this technology restricts applications and performance. In general, the low aspect ratio (height to width) structures of uniform thickness produced do not optimize functionality. While multiple layers have been employed to add thickness and features in a third dimension, the long development times, low yields and high costs involved restrict the number of layers which are practical. Furthermore, the materials used are primarily silicon-based.

Lithography-related techniques such as LIGA (from the German for lithography, electroplating and molding) allow aspect ratios to be increased substantially (see for example U.S. Pat. No. 5,162,078 in the name of P. Bley et. al. issued Nov. 10 1992). In these techniques two dimensional mask patterns are etched into resist layers that can be more than 300 micrometers thick. The resist layers are often used as molds. While lithography-related techniques produce high aspect ratio structures with high lateral resolution, these structures are of uniform thickness, or essentially two dimensional structures with added thickness.

Several three dimensional microfabrication technologies are under development, the most notable being focussed beam excimer laser machining, stereo lithography and laser-assisted chemical vapour deposition.

A three dimensional fabrication technology is defined as one that can be employed to generate objects of virtually arbitrary geometry. In general, achievable geometries are limited only by the requirements of material continuity with a supporting substrate and mechanical stability of the objects being constructed. Three dimensional fabrication technologies are capable of generating objects such as helically coiled springs and hollow spheres. Two classes of three dimensional fabrication technologies exist, namely those in which material is removed from an existing body, as in milling and sculpting, and those in which material is added to build up a structure, as in brick laying and stereo lithography. Material addition methods generally require few or no assembly steps. For example, the fabrication of a hollow sphere can be achieved in one process, without assembly, by the method of this invention, whereas with a machining process at least one assembly step is necessary. The minimization of assembly steps is especially important in microfabrication because manipulation of parts is particularly challenging. The ability to combine material removal and addition in one technology is very valuable because large numbers of part geometries can be constructed and modified, either by addition or removal of material.

Fabrication methods wherein patterns of relatively uniform depth are generated on a surface are not considered three dimensional. These include methods of patterning uneven and contoured surfaces.

Focussed excimer laser beams have been used to ablate a wide range of materials, including polymers, ceramics and metals (see for example J. M. Hagerhorst et. al. "Focussed Excimer Laser Beams: A Technique for Micropatterning", SPIE, vol. 52, pp.299–304, 1992.). Resolution of focussed beams is diffraction limited to approximately ≈0.2 micrometers. However, there is a tradeoff between depth of focus and resolution since high resolution requires high numerical aperture beams. Hence high aspect ratio is only practical with micrometer or larger features. Material removal technologies, such as excimer machining, are in general limited in their geometrical versatility, in part because they access through the outer surface of an existing substance.

In U.S. Pat. No. 4,929,402, issued May 29, 1990, C. H. Hull teaches a stereolithography method which has been employed by Ikuta et. al. to build microstructures ("Three Dimensional Micro Integrated Fluid Systems Fabricated by Stereo Lithography", Proceedings—IEEE Micro Electro Mechanical Systems, pp. 1–6, 1994.). In-stereo lithography a beam of radiant energy interacts with a photo-sensitive polymer, causing it to harden. Controlled volumetric irradiation of the polymer allows structures of virtually arbitrary geometry to be fabricated. Materials are limited to a selection of photosensitive polymers, however. Resolution is restricted by diffraction limits and viscous forces from the unhardened polymer on the hardened material. The best resolution achieved to date is about 10 micrometers.

M.Boman et. al. describe a microfabrication method employing laser assisted chemical vapour deposition (LCVD) to fabricate three dimensional structures ("Helical Microstructures Grown by Laser Assisted Chemical Vapour Deposition", Proceedings—IEEE Micro Electro Mechanical Systems, pp. 162–167, 1992.). T. M. Bloomstein et. al. describe a similar method for depositing and etching material in U.S. Pat. No. 5,389,196, issued Feb. 14, 1995. A focussed photon, ion or electron beam interacts with a substrate surface in a vapour atmosphere, inducing a local chemical reaction, and resulting in material being deposited from the vapour or etched from the substrate. Reported resolutions using photon beams are ≦10 micrometers, limited by diffraction and thermal conduction at the substrate surface. Electron beams have enabled 0.2 micrometer resolution, but at the expense of deposition rate, which is on the order of 0.02 micrometers per second (see W. H. Brunger et. al., "E-beam Induced Fabrication of Microstructures", Proceedings—IEEE Micro Electro Mechanical Systems, pp. 168–170, 1992). Photon beam induced deposition rates of several micrometers per second are achieved in building three dimensional structures. In the deposition process, materials are restricted to those that can be grown on a substrate from vapour phase via a chemical reaction. Common materials are tungsten, boron and silicon.

Electrochemical deposition and Etching

A wide range of materials can be electrodeposited, including many metals and alloys, some polymers (such as polyaniline and polypyrrole), and semiconductors (such as cadmium chalcogenides). Electrochemical etching enables many of the same materials to be machined as well as others such as gallium arsenide. However, in conventional electroplating deposition occurs indiscriminately on a substrate, forming thin films rather than three dimensional structures. Rates of deposition are generally slow (e.g. about 100 micrometers per hour). Electroforming is used to build three dimensional structures. There is still the difficulty of fabricating the mold however.

Three basic approaches have been taken to create lateral features in deposits. The first makes use of lithography to selectively etch features in a deposited film. This method is used to make electrical connections for integrated circuits, for example. The aspect ratios achieved are particularly low due to etching undercut. Two other approaches involve either locally enhancing deposition rate by local heating, or placing a small electrode near the substrate to localize the reaction.

In laser enhanced electroplating and etching, laser light is focussed on a substrate, heating a local region, as taught by U.S. Pat. No. 4,497,692 (Gelchinski et. al., Feb. 5, 1985) U.S. Pat. No. 4,432,855 (L. T. Romankiw, issued Feb. 21, 1984), and U.S. Pat. No. 4,497,692 (D. R. Vigliotti et. al., issued Feb. 5, 1985) The heating locally enhances deposition and etching rates by as much as three to four orders of magnitude. Jet-plating and etching, in which a jet of plating or etching solution locally impinges on a substrate, is combined with laser enhanced electroplating, as described in U.S. Pat. No. 4,349,583, to improve deposit and etch properties, and to further enhance reaction rate. Laser enhanced electroplating (etching) produces two dimensional patterns deposited (etched) by scanning the beam parallel to the substrate surface. Resolution is again limited by diffraction as well as the substrate thermal conductivity. Reported resolutions are ≧2 μm. Deposition rates, however, are high (about 10 micrometers per second)

Lin et. al. describe a method whereby placing a sharp-tipped electrode (scanning tunneling microscope tip) close to a substrate surface in a conducting solution, and applying a selected potential between the tip and the substrate, local etching is induced ("High Resolution Photochemical Etching of n-GaAs with the Scanning Electrochemical and Tunneling Microscope", Journal of the Electrochemical Society", vol. 134, pp.1038–1039, 1987). They use an approximately 0.1 micrometer diameter electrode in close proximity (<1 micrometer) to a GaAs substrate to etch 0.3 micrometer wide lines. The GaAs substrate is uniformly irradiated by a light source to make it conductive. An electrochemical reaction is induced on the substrate whose spatial distribution is a function of the surface current distribution, which in turn depends on the applied potential, and the tip to substrate distance. The tip was scanned parallel to the substrate to form lines. No attempt was made to build a three dimensional object.

U.S. Pat. No. 4,968,390 describes a method to electrochemically deposit conducting substances on the surfaces of conducting objects (Bard et.al., issued Nov. 6, 1990). The invention involves coating a substrate with a thin, ionically conducting film containing the reactant to be deposited, and scanning laterally across the film to deposit and etch lines of widths as small as ≈0.2 micrometers, where the feature size is limited by the sharpness of the tip. Deposition and etching in three dimensions is not possible using this method since the solid electrolyte effectively fixes the tip to substrate spacing.

Schneir et. al. describe a similar method wherein an electrode is placed 1 micrometer from a gold substrate in a liquid plating solution and a potential is applied across the gap ("Creating and Observing Surface Features with a Scanning Tunneling Microscope", SPIE vol. 897, pp. 16–19, 1988). Positioning of the tip relative to the substrate is achieved by first finding the substrate surface using the tip in tunneling mode. In their method the tip and the substrate are immersed in an electroplating solution. The applied potential induces electrodeposition at the surface. The tip was moved back and forth in a line parallel to the gold substrate to produce a line of electrodeposited gold about 0.3 micrometers wide. There is no description or discussion of using this technique to build three dimensional objects.

It is the object of the invention to provide a process for producing three dimensional structures with sub-micrometer spatial resolution employing a range of materials selected from metals, polymers, and semi-conductors that will attempt to overcome the lack of fabrication methods capable of producing three dimensional objects from a wide range of materials and with sub-micrometer spatial resolution.

Further objects and advantages will become apparent from a consideration of the drawings and ensuing descriptions.

SUMMARY OF INVENTION

These and other objects of the invention are achieved by a method which in one aspect features a method for producing a three dimensional object. The method includes the steps of providing a suitable conducting substrate, an electrode and a solution. The outer surface of the substrate defines an interface. The electrode must have at least a feature with at least a dimension that is small relative to the dimensions of the interface. The solution contains a reactant that will, in an electrochemical reaction, deposit a desired material. The electrode feature or features are placed close to but not contacting the interface. Local deposition of the material is achieved by passing a current between the electrode and the substrate through the solution. Relatively moving the electrode and the substrate along a selected trajectory, and locally depositing in the process, enables the fabrication of a three dimensional object, given that part of the trajectory and some corresponding deposition occurs normal to the surface. In etching the surface to form a three dimensional object, the procedure is almost the same as described for deposition. The solution is chosen such that, in an electrochemical reaction, the substrate is etched, rather than material deposited. Furthermore, etching is performed along a trajectory that contains a component normal to and towards the substrate surface.

In the method descibed, more than one reactant may be provided in the solution. Varying the potential can then bemused to selectively deposit the different materials as chosen, or a combination of them together (in an alloy for example). The deposited material may be a pure metal, an alloy, a polymer or a semiconductor. Similarly, more than one reactant may be provided to selectively etch various materials that comprise the substrate individually, or simulateneously. The substrate materials may also be metals, alloys, semiconductors or polymers.

An example electrode is a sharp conducting wire with a tip diameter of between about 5 and 200,000 nm. The tip provides the feature mentioned above. Another example electrode is an approximately disk-like or hemispherical electrode having about the same range of dimensions as the tip. More general shapes and patterns are also possible. As an illustrative example, the feature may be placed within approximately its own smallest dimension of the interface in order to localize the deposit or etch. Multiple electrodes can also be provided, as opposed to just one, providing that they each have at least a feature with a dimension that is small relative to the substrate. Each electrode is used just as described for a single electrode.

Injecting fresh solution into the region of the localized electrochemical reaction (etching or deposition) can improve mass transfer and thereby increase the rate. In the case of deposition, the quality may also be improved. Therefore the invention provides for the optional addition of a nozzle, through which the solution is pumped into the region between the electrode and the interface during deposition or etching.

In accordance with an aspect of the invention there is further provided a method for producing a localized deposit of material comprising the steps of providing a substrate, an electrode, a nozzle, and a solution. The substrate has an outer conducting surface defining an interface. The solution contains a reactant which will, through an electrochemical reaction, lead to the deposit of a desired material. The nozzle is electrically isolated from the electrode and the substrate. The nozzle is placed between the electrode and the interface such that any current between them will pass through the nozzle. A flow is generated through the nozzle's orifice, which is positioned close to, but not in contact with, the substrate. Passing a current between the electrode and the substrate, and therfore through the orifice, induces a spatially localized electrochemical reaction at the interface. The product of the reaction is the deposited material and thus material is locally deposited. Localized etching is achieved in the same manner, with the following exceptions. The solution contains a reactant which will, through an electrochemical reaction, lead to the etching of a selected material. Thus the step of passing a current through the orifice leads to localized etching of the substrate.

Following the same steps described in the previous paragraph, with the added step of relatively moving the electrode and the substrate along a selected trajectory, and locally depositing in the process, enables the fabrication of a three dimensional object, given that part of the trajectory and some corresponding deposition occurs normal to the surface. The same applies to etching the surface, where local deposition is replaced by local etching.

Advantageously, the method of the current invention allows three dimensional microstructures having a wide range of possible geometries, and composed of a wide variety of materials to be constructed with a resolution dependent only on the ability to localize electrochemical deposition or etching.

BRIEF DESCRIPTION OF DRAWINGS

Exemplary embodiments of the invention will now be described in conjunction with the drawings in which.

DETAILED DESCRIPTION

Figure 1A:
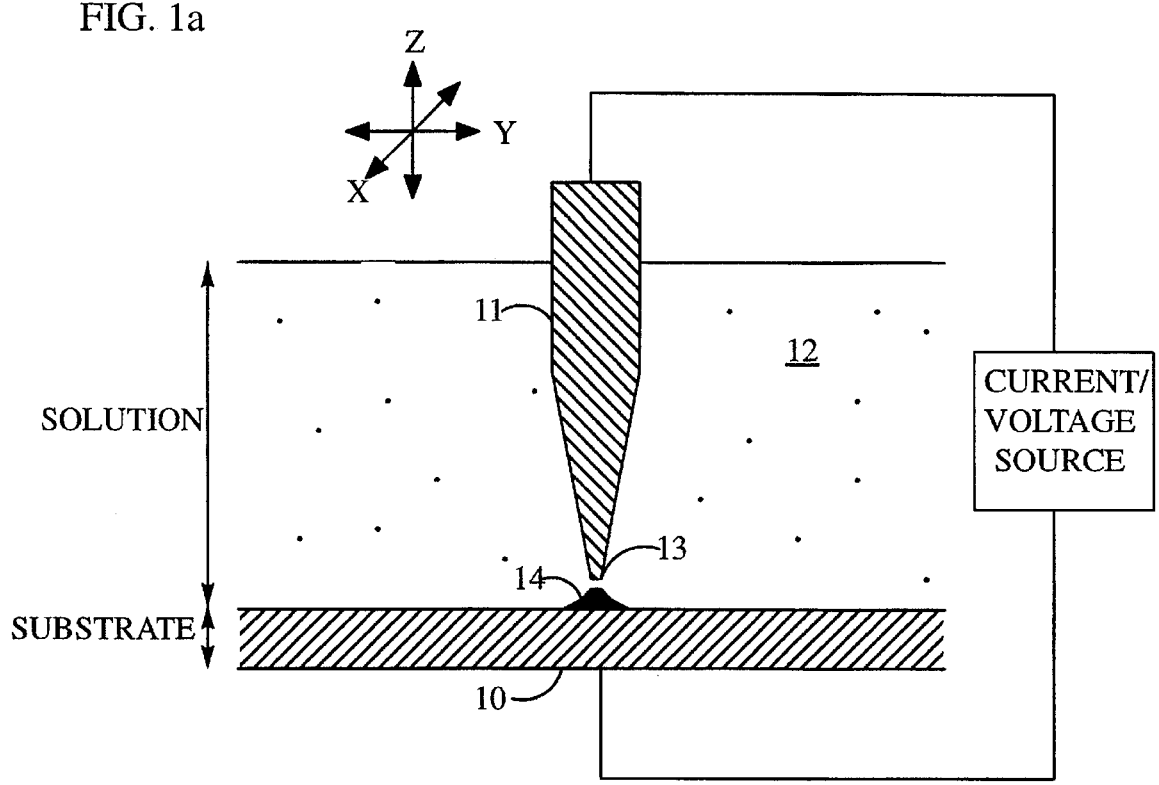
FIG. 1a shows a schematic representation of a method to locally electrodeposit material on a conducting substrate.
Figure 1B:
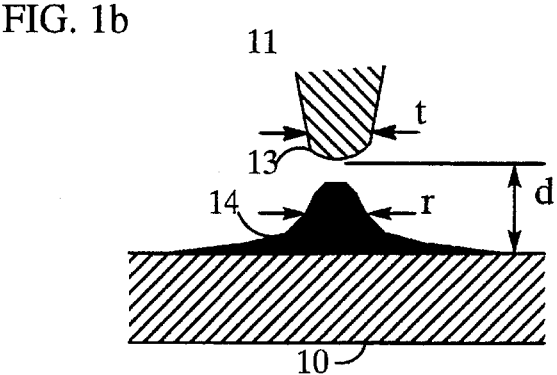
FIG. 1b shows a schematic representation of a sharp electrode placed close to but spaced from a conducting substrate.
Figure 1C:
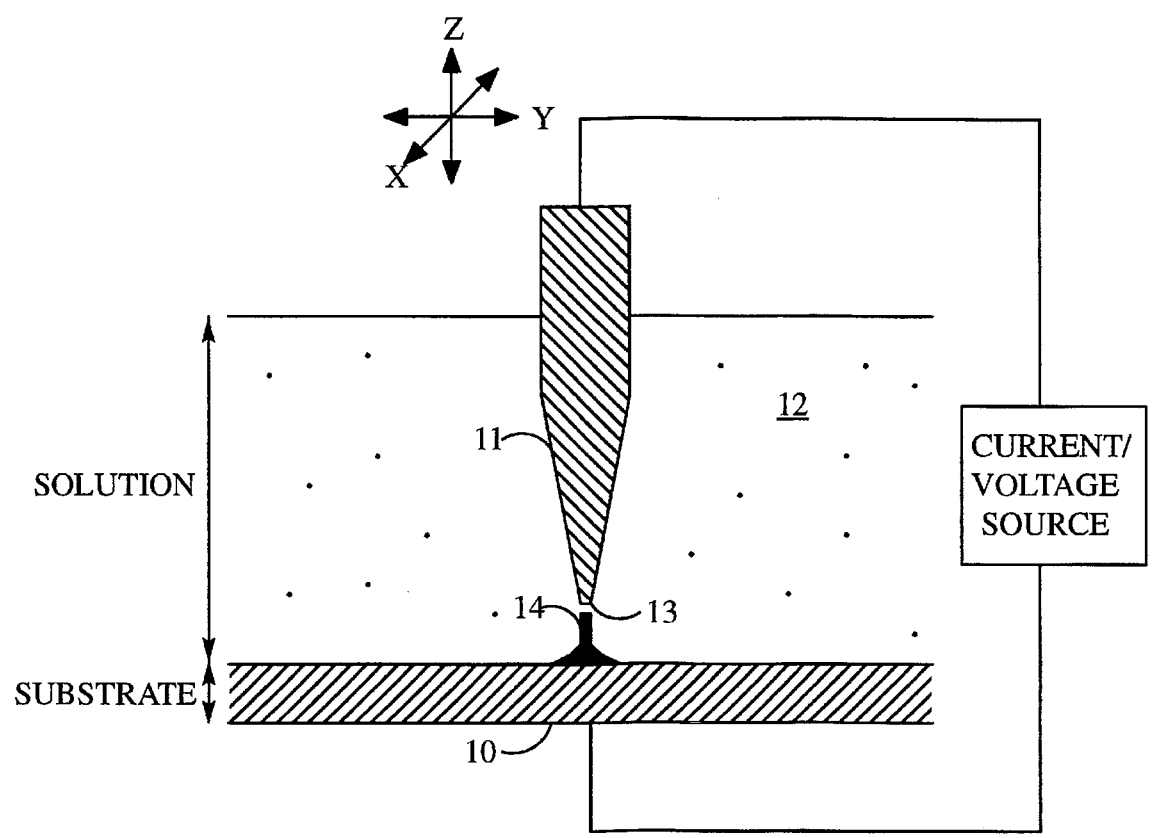
FIG. 1c shows a schematic representation of the result of the tip being translated vertically with simultaneous deposition as an illustration of a trajectory leading to the fabrication of a three dimensional object.
Figure 1D:
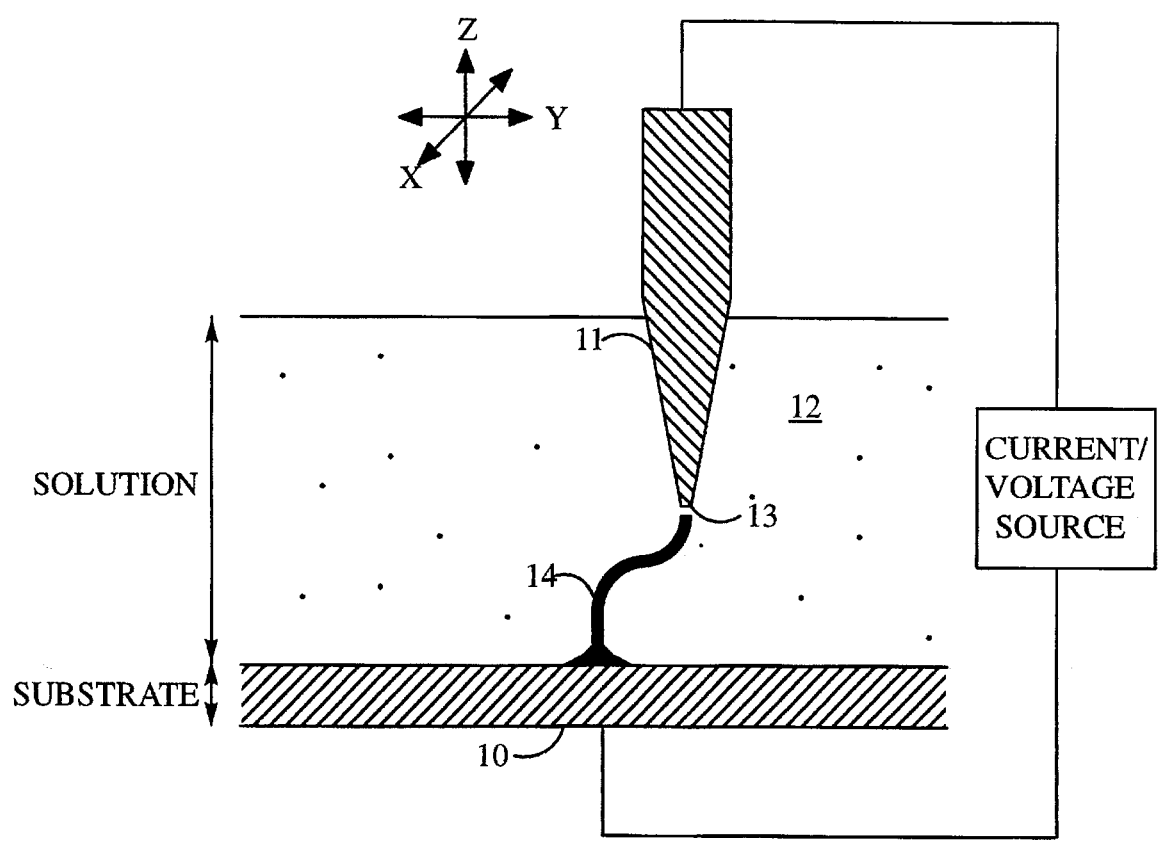
FIG. 1d shows a schematic representation of the result of the tip being further translated from the situation shown in FIG. 1c leading to the fabrication of a three dimensional object.
Figure 2A:
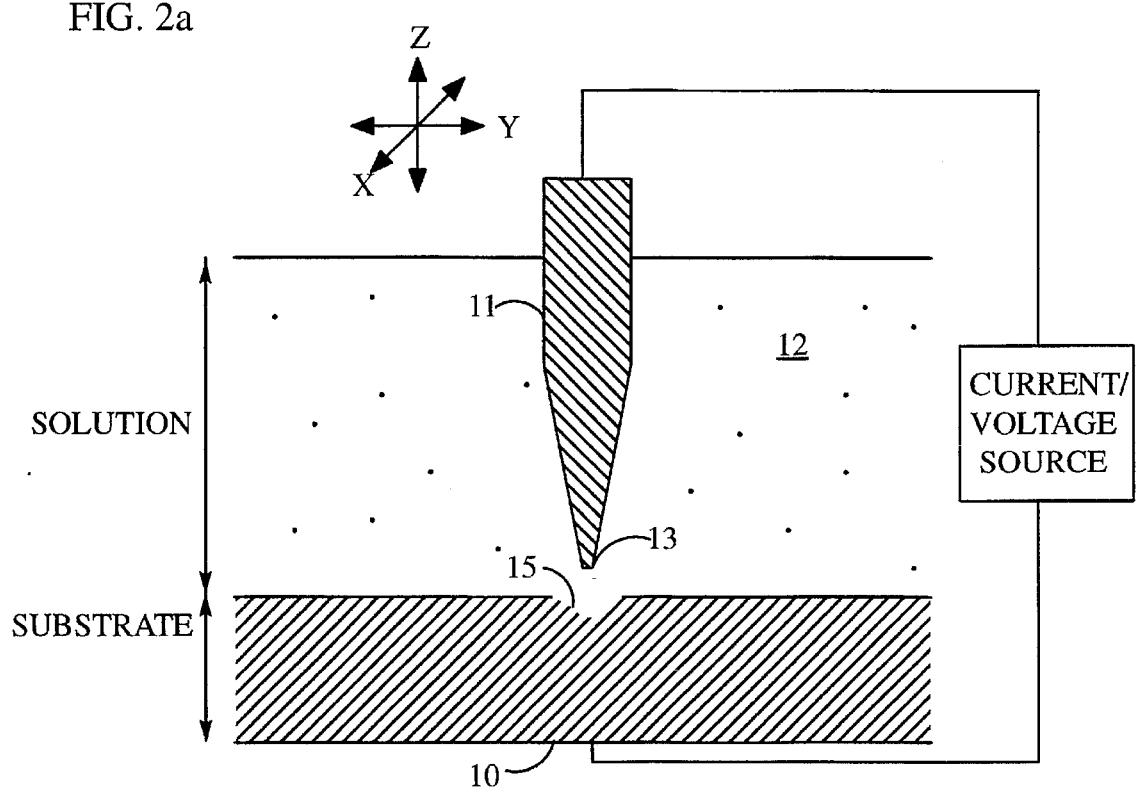
FIG. 2a shows a schematic representation of a method to locally electrochemically etch material on a conducting substrate.
Figure 2B:
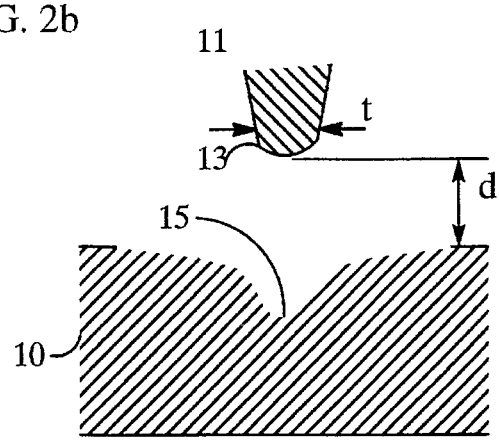
FIG. 2b shows a schematic representation of a sharp electrode placed close to but spaced from a conducting substrate.
Figure 2C:
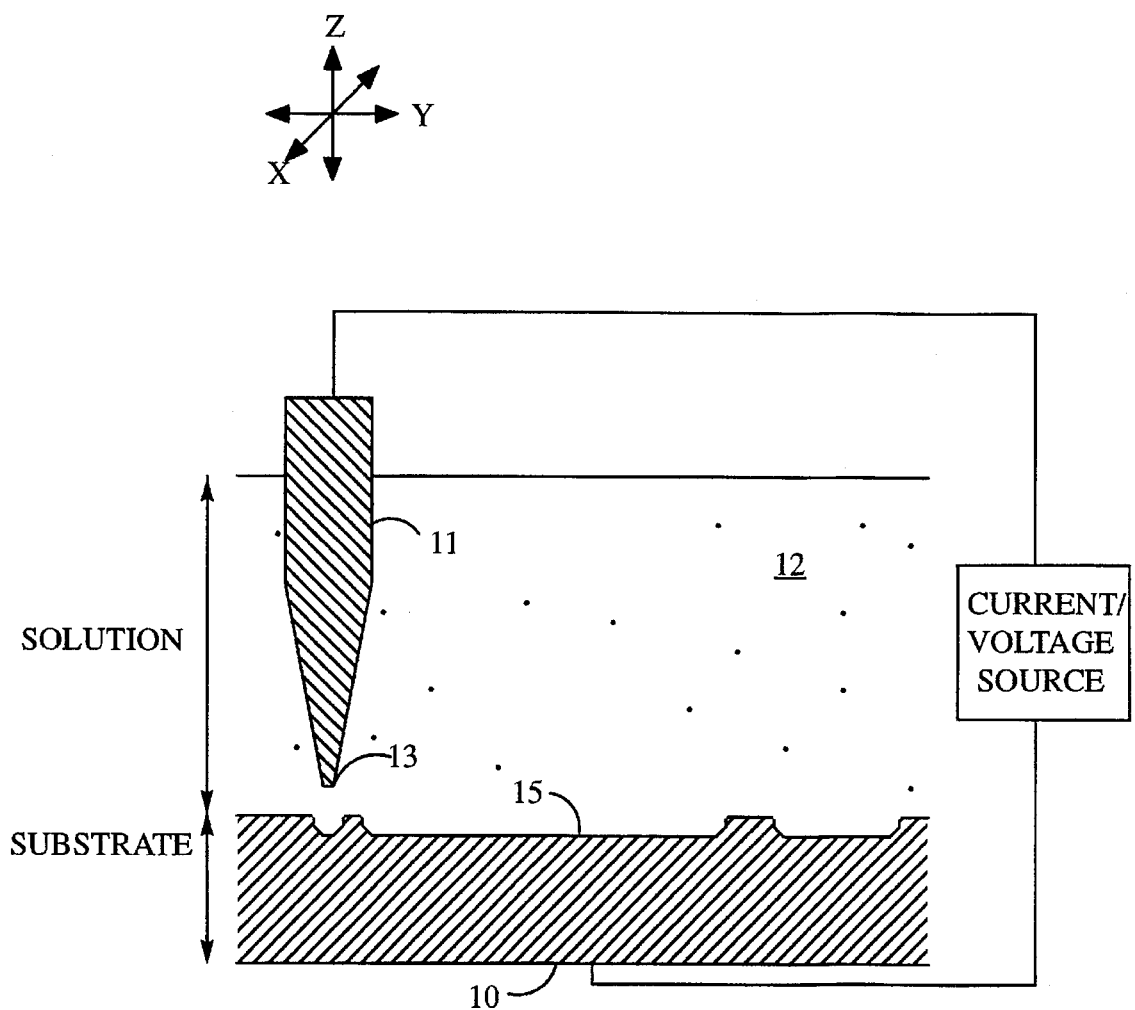
FIG. 2c shows a schematic representation of material being selectively removed from a layer of the substrate.
Figure 2D:
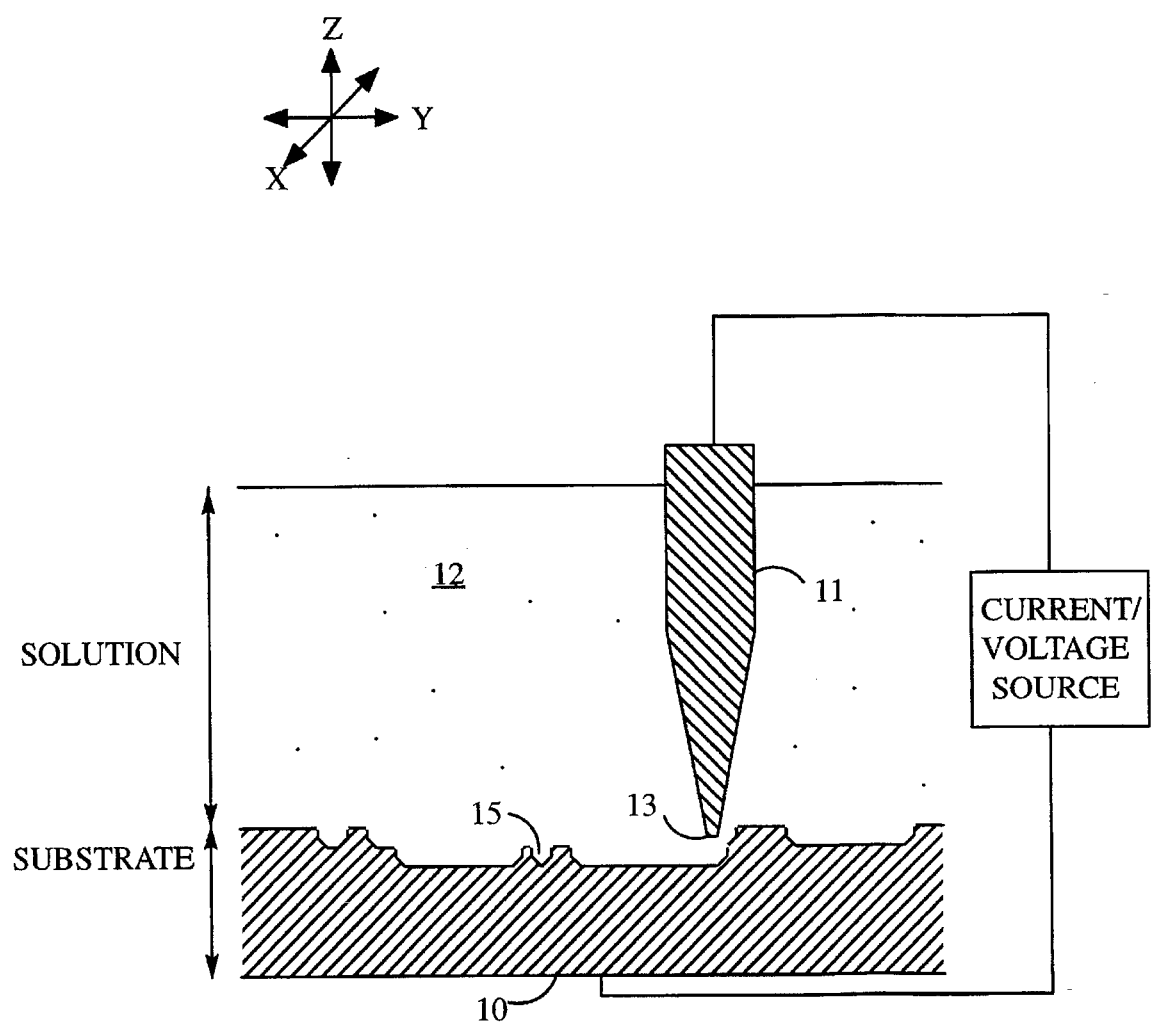
FIG. 2d shows a schematic representation of material being selectively removed from a second layer of the substrate leading to the fabrication of a three dimensional object.

The present invention involves a new method of depositing metals, polymers and semiconductors and of etching metals, semiconductors, ceramics and polymers with high resolution and in three dimensions. Deposition and etching are achieved by electrochemical reactions which are localized on a conducting surface.

The method involves choosing a suitable conducting substrate and a liquid solution that contains reactant(s) that will deposit the desired product(s) upon electrochemical oxidation or reduction. In the etching case the reactant(s) are chosen so that they will etch the substrate. An electrode is provided with characteristic features that are small relative to the size of the substrate. By placing these features close to the substrate, and applying an appropriate potential, current and thus either etching or deposition on the substrate are localized. The electrode is then moved relative to the substrate in three dimensions to form structures, either building up material from the substrate, or etching it away.

An illustrative system for carrying out the process is schematically shown in FIG. 1. The etching case is shown in FIG. 2. A conducting substrate 10 and an electrode 11 are immersed in a solution containing reactant(s) 12. The substrate 10 is prepared for deposition such that the surface roughness is significantly less than the desired fabrication resolution. This may be achieved by evaporating metal onto glass slides or other materials. Alternatively, mechanical polishing or electropolishing can be employed. In the etching case, surface roughness on the order of etching resolution can be smoothed as part of the process. The electrode 11 has a sharp tip 13 and is typically made of platinum or platinum iridium, whose preparation has been previously described in scanning tunneling microscopy related literature. However, the electrode 11 can potentially be made of any electrically conducting material, including, but not limited to metals, carbon, and conducting polymers. The tip 13 dimensions range between about 5 and 200 000 nm in diameter. Motors drive the tip relative to the substrate in X, Y and Z directions. In the exemplary embodiment microstepping motors were used. However voice coil actuators and other motors capable of producing sub-micrometer scale displacements are also appropriate. Rotational degrees of freedom can be added, allowing the direction of growth or etching to be perpedicular to the electrode surface. Degrees of freedom can be attached to either the electrode, the substrate or both since it is the relative motion that is important. An example combination of substrate 10 and solution 12 for deposition is copper in a sulfamate nickel plating solution.

The tip 13 is positioned close to the substrate 10 in order to localize deposition or etching. The appropriate tip to substrate separation in order to achieve a given localization, or spatial resolution, depends on tip geometry, the solution and reactant(s) used, the applied potential between the tip and the substrate and to some extent on the tip and substrate materials. In general to achieve a given resolution, r, the distance, d, between the tip and the substrate should be $\leq r$, with a tip diameter, $t \leq r$. For a given tip, the best achievable resolution is $\geq t$ given $t \geq d$.

Electrode geometries other than sharp tips can be employed to generate a spatially modulated field distribution. Disk or hemispherical electrodes can be used, for example. Given an electrode diameter, d, resolution is again obtained as described in the previous paragraph. Electrodes of virtually arbitrary geometry can be used to effect localized etching and deposition, providing a dimension of some feature is small relative to the interface size. A razor blade geometry, for example, can be employed, with the sharp edge aligned parallel to the interface. Moving the electrode vertically allows the construction of a wall. In order to deposit or etch a given electrode pattern the smallest dimensions of the pattern should be approximately its own wdith away from the surface. The advantage of using non-tip geometries is that structures are then effectively being built-up in parallel. However, the tip electrode described above is both the simplest to fabricate and implement, and can generate the widest range of structure geometries. The use of several electrodes acting in parallel offers the possibility of both maximum resolution and parallel fabrication. These electrodes can move together, or independently. The potentials of all electrodes need not be the same, such that etching and deposition can be effected simultaneously. Two or more materials might also be etched or deposited and etched simulataneously, as controlled by electrode potentials. Having multiple electrodes of different sizes and shapes could be used to optimize fabrication rates.

There are several means of setting the initial tip position relative to the substrate, including using feedback on Faradaic current (see for example A. A. Gewirth et. al., "Fabrication and Characterization of Microtips for in situ Scanning Tunneling Micorscopy", Jounal of Electroanalytical Chemistry", vol. 261, pp. 477–482, 1989) and bringing the tip within tunneling current range and then retracting it as Schneir et. al. do, referenced above. A tip to substrate potential can also be applied and the tip lowered until a sharp rise in current is observed, indicating electrode to substrate contact. In order to use the later procedure for tip diameters, $t \leq 30$ µm, it is preferred that the electrode 11 be insulated, leaving the tip area exposed. This is because the impedance on tip to substrate contact apparently becomes comparable to the impedance between the rest of the exposed wire, through the solution, to the tip. Several methods for coating sharp electrodes are listed in the following two references: A. A. Gewirth et. al. above; Nagahara et. al., "Prepartation and Characterization of STM Tips for Electrochemical Studies", Review of Scientific Instruments, vol. 60, pp. 3128–3130, 1989. Furthermore, by insulating the tip the spatial resolution is improved somewhat. However it appears to be the concentration of field provided by the sharp tip combined with the tip to substrate distance, d, that most affects resolution, rather than the level of insulation. For positioning purposes the tip need not be coated right to the end, but rather such that the impedance offered by the electrode to substrate contact is much the solution impedance.

An oxidation or reduction potential is applied to induce deposition, FIG. 1, or etching, FIG. 2, once the electrode 11 is properly positioned. Either a voltage supply or a current source connected between the electrode 11 and the substrate 10 may be employed. The appropriate potential depends on the reactant(s) and results in a deposition 14 or etching 15. If nickel is to be deposited from a sulfamate solution onto a copper substrate using a platinum electrode, for example, a voltage between about 2.5 V and 5.0 V is appropriate. At high voltages deposition rates are observed to be $\geq 10$ µm/s.

In order to generate three dimensional objects the electrode is translated along a three dimensional trajectory. A number of such trajectories are possible. For example, the electrode can be raster scanned over the substrate surface, moving normal to the surface by a fixed increment after each scan. Potential or current can be varied as a function of position in order to produce lateral and vertical features. A random access mode is also possible. FIG. 2 shows a sequential layer etching approach, while FIG. 1 illustrates continuous deposition. The deposition of certain structures, including helical springs for example, are well suited to continuous deposition, as shown in FIG. 1. These are but a few of the possible trajectories.

In order to fabricate in three dimensions material deposited must be conductive and electrically continuous with the substrate. Also, as deposition proceeds the electrode position relative to the interface must be maintained as described above for the initial positioning to maintain resolution.

There are several methods of maintaining the appropriate tip to surface separation, d. For deposition the most straightforward is to move at a rate slower than the deposit growth rate. Deposited material can grow to contact the electrode, at which point deposition will cease as electrons flow through the low resistance contact region. The reaction is effectively self-limiting. Alternatively, the contact between the deposit and the electrode can be detected, either by a rise in current or a reduction in current fluctuations. Current fluctuations are particularly large when bubble formation is occuring, which stops on contact. The contacting is then used to signal further motion or to increase speed, for example. Other control methods exist including periodically moving to contact the surface and then retracting, moving to within tunneling range to check the surface location (Schneir et. al., "Creating and Observing Surface Features with a Scanning Tunneling Microscope", SPIE vol. 897, pp. 16–19, 1988), using Faradaic current to determine the separation distance (A. A. Gewirth et. al., "Fabrication and Characterization of Microtips for in situ Scanning Tunneling Micorscopy", Jounal of Electroanalytical Chemistry", vol. 261, pp. 477–482, 1989), and measuring impedance changes at sensistive frequencies. The Faradaic current and impedance methods are not very reliable in the presence of noise, as occurs, for example, during bubble formation. The noise can be useful in determining distance from the substrate. The release of bubbles from the electrode is affected by the tip to substrate distance, which in turn changes the nature of current fluctuations. This method is somewhat complex because the frequency and amplitude of bubble release is not solely related to distance to the substrate. The same control schemes are used with etching, except that in the contact method substrate to electrode contact is used as a signal to stop the relative motion rather than to continue.

An alternative embodiment combines the localization of deposition or etching with localized solution flow. As in jet-plating and jet-etching a solution stream is focussed onto the substrate, increasing rates of mass transfer. Deposited structures are found to exhibit superior properties, including density and adhesion.

Figure 3:
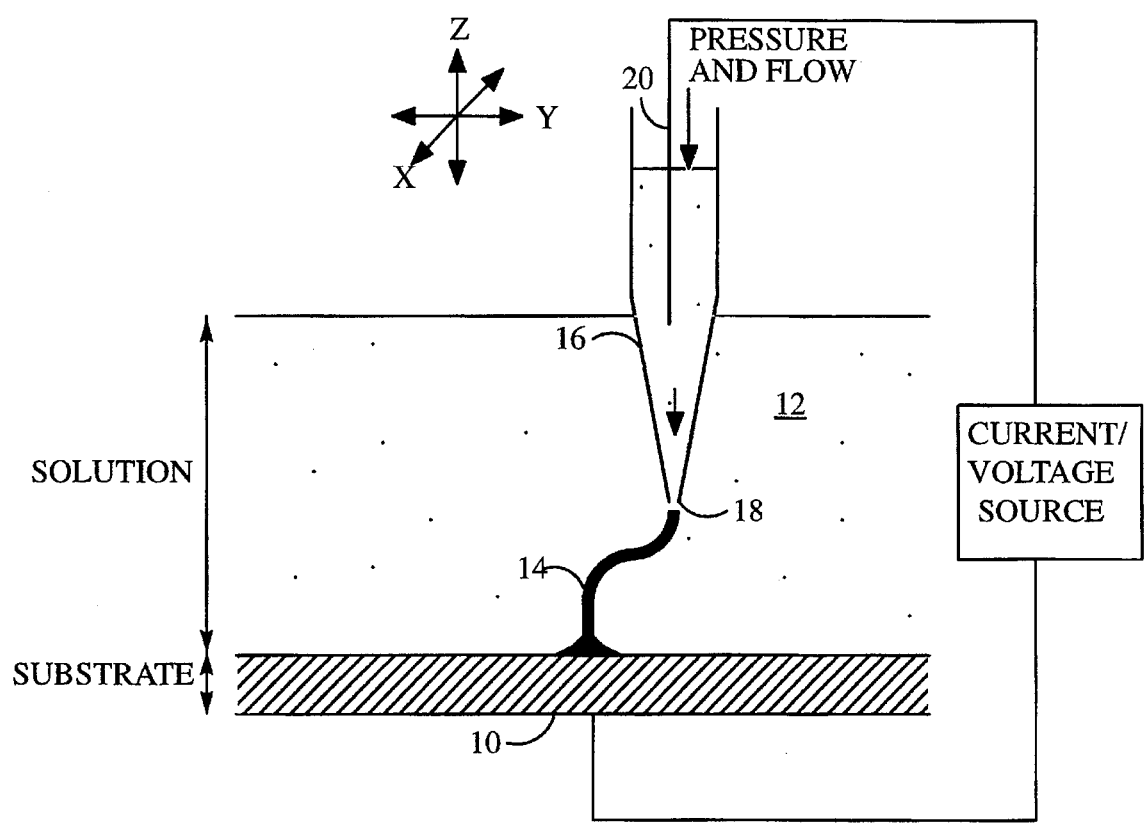
FIG. 3 shows a schematic representation of an embodiment in the deposition configuration wherein current is channelled through an orifice, through which solution is being forced.

The embodiment is schematically shown in FIG. 3. The two principal differences between this embodiment and those shown in previous figures are that current is channelled from the electrode 20 to the substrate surface 10 through a pipette 16 and that flow is induced. Standard techniques are used to pull quartz and glass pipettes with orifice diameters between 0.02 and 10 µm. Pressure is applied to induce flows of up to 0.05 m/s or more. The appropriate distance, d, between the orifice 18 and the surface in order to achieve a given resolution, r, is as before and the scanning methods are the same. Note that flow can be directed out of the pipette or into it. Normally it is directed outward to locally inject a fresh supply of plating solution, thereby increasing mass transfer.

The technique is not limited to deposition of metals. Semiconductors (such as cadmium chalcogenides) and polymers (such as polyaniline and polypyrrole) can also be electrodeposited. For example, polyaniline can be deposited on stainless steel from 0.1M aniline and 1.0M $H_2SO_4$ by cycling the potential between −100 mV and 750 mV vs. SCE. Once deposited, conductivity of polyaniline and other conducting polymers, can be switched by up to 11 orders of magnitude by changing oxidation state. Changes in oxidation state can also be accompanied by dimensional changes, making them useful actuators. CdTe can be deposited from $CdSO_4$ and $TeO_2$. The conductivity can be changed from n to p type by changing or manipulating the potential.

Actual and likely future advantages of embodiments of the present invention include the following examples:

1. The deposition of many materials including Al, Ag, As, Au, Bi, Cd, Co, Cr, Cu, Fe, In, Ir, Mn, Ni, Os, Pb, Pd, Pt, Re, Rh, Ru, Sb, Se, Sn, Tc, Te, Tl and Zn.

2. Depositing alloys including brass, bronze, electrodepositable gold alloys, Cd-Ti, Co-W, Zn-Ni, Sn-Ni, Ag-Pb, Ni-Co, Ni-P, Ni-Fe, Ni-Ti, Sn-Pb and other electrodepositable alloys.

3. The deposition of conducting polymers such as polyaniline and polypyrrole. These materials have many applications including use in batteries, actuators, capacitors, transistors, chemical sensors and electrochromic devices.

4. The control of potential such that either deposition or etching of a given material, without changing solution, is possible.

5. Semiconductors such as GaAs can be irradiated to make them conductive, thereby making them suitable as substrates for etching and deposition.

6. The use of multiple electrodes providing the following advantages:
   (a) Increasing the speed of fabrication by depositing and etching in parallel;
   (b) Allowing for multiple electrode geometries and sizes;
   (c) Enabling different reactants to be simultaneously deposited and etched by independently controlling the potentials at each electrode and using multiple reactants.

7. The ability to achieve sub-micrometer resolution by spatially localizing an electrochemical reaction. Resolution is not diffraction limited, as in many other processes. among other advantages and embodiments.

Conclusion

As previously stated, important properties on which microfabrication technologies are judged include the range of achievable structure geometries, spatial resolution, the range of materials available, rate and cost. The invention described enables three dimensional metal, polymer and ceramic structures to be rapidly formed. Unlike other three dimensional fabrication processes, spatial resolution is not restricted by the diffraction limit of light. Finally, the apparatus is relatively simple and inexpensive, especially when compared with microelectronics technology.

While the above description contains many specificities, these should not be construed as limitations on the scope of the invention, but rather as exemplifications of preferred embodiments thereof. Accordingly the scope of the invention should be determined not by the embodiments illustrated, but by the appended claims and their legal equivalents.

We claim:

1. A method for producing a three dimensional object comprising the steps of
   (a) providing a substrate having an outer conducting surface defining an interface;
   (b) providing an electrode having at least a feature having at least a dimension that is small relative to the dimensions of the interface;
   (c) providing a solution having a selected reactant that will, in an electrochemical reaction, deposit a desired product;
   (d) positioning the feature at a starting distance from the substrate such that the feature is close to but spaced from the interface;
   (e) selecting a trajectory for relatively moving the electrode and the substrate, at least part of the trajectory having a directional component normal to the substrate surface, such that when the trajectory is followed a feature to substrate separation of at least several times the starting distance is generated somewhere along the trajectory;
   (f) depositing the product by passing a current between the electrode and the substrate and through the solution to induce a spatially localized electrochemical reaction at the interface;
   (g) relatively moving the electrode and the substrate along the trajectory; and
   (h) repeating step (f) along the trajectory;

where the depositing of the product along the trajectory, including at one or more locations several times the starting distance away from the substrate, forms the three dimensional object.

2. The method of claim 1, further comprising the step of providing further reactants in step (c) that will, in an electrochemical reaction, deposit a desired product.

3. The method of claim 1, wherein the deposited product is at least in part selected from the group consisting of comprising electrodepositable metals, alloys, polymers and semiconductors.

4. The method of claim 1, wherein the electrode provided in step (b) is a sharp conducting wire having a tip having a diameter between about 5 and 200 000 nm, the tip providing the feature in step (b).

5. The method of claim 1, wherein the smaller feature dimension provided in step (b) is a distance, d; and wherein step (d) in claim 1 is performed such that the smaller dimension of the feature provided in step (b) is placed within about a distance, d, of the surface defined by the interface.

6. The method of claim 1 wherein the electrode is approximately disk-shaped or hemispherical having a diameter between about 5 and 200 000 nm.

7. The method of claim 1, further comprising the steps of providing a plurality of electrodes in step (b) each having at least a feature having at least a dimension that is small relative to the dimensions of the interface; and wherein each electrode is subject to the remaining steps of claim 1.

8. The method of claim 1, further comprising the steps of providing an orifice; and generating a flow of the solution provided in step (c) of claim 1 directed by the orifice to the region between the electrode and the interface.

9. A method for producing a three dimensional object comprising the steps of
   (a) providing a substrate having an outer conducting surface defining an interface;
   (b) providing an electrode having at least a feature having at least a dimension that is small relative to the dimensions of the interface;
   (c) providing a solution having a selected reactant that will, in an electrochemical reaction, etch the substrate;
   (d) positioning the feature at a starting distance from the substrate such that the feature is close to but spaced from the interface;
   (e) selecting a trajectory for relatively moving the electrode and the substrate, at least part of the trajectory having a directional component normal to the substrate surface, such that when the trajectory is followed while etching the electrode feature penetrates at least several times the starting distance into the etched substrate somewhere along the trajectory;
   (f) etching the substrate by passing a current between the electrode and the substrate and through the solution to induce a spatially localized electrochemical reaction at the interface;
   (g) relatively moving the electrode and the substrate along the trajectory; and
   (h) repeating step (f) along the trajectory;
where the etching of the substrate along the trajectory, including at one or more locations penetrating several times the starting distance into the substrate, forms the object.

10. The method of claim 9, wherein the substrate material is at least in part a material selected from the group consisting of metals, alloys, polymers and semiconductors.

11. The method of claim 9, wherein the electrode provided in step (b) is a sharp conducting wire having a tip having a diameter between about 5 and 200 000 nm, the tip providing the feature in step (b).

12. The method of claim 9, further comprising the steps of defining the smaller feature dimension provided in step (b) as a distance, d; and placing the smaller dimension of the feature provided in step (b) within about a distance, d, of the surface defined by the interface.

13. The method of claim 9, wherein the electrode is approximately disk-shaped or hemispherical having a diameter between about 5 and 200 000 nm.

14. The method of claim 9, further comprising the steps of providing a plurality of electrodes in step (b) each having at least a feature having at least a dimension that is small relative to the dimensions of the interface; and wherein each electrode is subject to the remaining steps of claim 9.

15. The method of claim 9, further comprising the steps of providing an orifice; and generating a flow of the solution provided in step (c) of claim 9 directed by the orifice to the region between the electrode and the interface.

16. A method for producing a three dimensional object comprising the steps of
   (a) providing a substrate having an outer conducting surface defining and interface;
   (b) providing an electrode;
   (c) providing an orifice that is electrically isolated from the electrode and the substrate;
   (d) providing a solution having at least a selected reactant that will, in an electrochemical reaction, deposit a desired product;
   (e) placing the orifice in the solution and between the electrode and the interface such that current between the electrode and the interface will pass through the orifice;
   (f) positioning the orifice at a starting distance from the substrate such that the feature is close to but spaced from the interface;
   (g) generating a flow of solution through the orifice sufficient to greatly increase mass transport of the reactant to the surface;
   (h) selecting a trajectory for relatively moving the orifice and the substrate, at least part of the trajectory having a directional component normal to the substrate surface, such that when the trajectory is followed an orifice to substrate separation of at least several times the starting distance is generated somewhere along the trajectory.;
   (i) depositing the product by passing a current between the electrode and the substrate and through the solution to induce a spatially localized electrochemical reaction at the interface; and
   (j) repeating step (i) along the trajectory;
where the depositing of the product along the trajectory, including at one or more locations several times the starting distance away from the substrate, forms the three dimensional object.

17. A method for producing a three dimensional object comprising the steps of
(a) providing a substrate having an outer conducting surface defining and interface;
(b) providing an electrode;
(c) providing an orifice that is electrically isolated from the electrode and the substrate;
   (d) providing a solution having at least a selected reactant that will, in an electrochemical reaction, etch the substrate;
   (e) placing the orifice in the solution and between the electrode and the interface such that current between the electrode and the interface will pass through the orifice;

(f) positioning the orifice at a starting distance from the substrate such that the feature is close to but spaced from the interface;

(g) generating a flow of solution through the orifice sufficient to greatly increase mass transport of the reactant to the surface;

(h) selecting a trajectory for relatively moving the orifice and the substrate, at least part of the trajectory having a directional component normal to the substrate surface, such that when the trajectory is followed while etching the orifice penetrates at least several times the starting distance into the etched substrate somewhere along the trajectory;

(i) etching the substrate by passing a current between the electrode and the substrate and through the solution to induce a spatially localized electrochemical reaction at the interface; and (j) repeating step (i) along the trajectory;

whereby the etching of the substrate along the trajectory, including at one or more locations penetrating several times the starting distance into the substrate, forms the object.

* * * * *